US008650328B1

(12) United States Patent
Chatterjee et al.

(10) Patent No.: US 8,650,328 B1
(45) Date of Patent: Feb. 11, 2014

(54) BI-DIRECTIONAL COMMUNICATION BETWEEN REDUNDANT STORAGE CONTROLLERS

(75) Inventors: Paresh Chatterjee, Fremont, CA (US); Vijayarankan Muthirisavengopal, Newark, CA (US); Naraynan Balakrishnan, Chennai (IN); Jomy Maliakal, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 81 days.

(21) Appl. No.: 12/612,736

(22) Filed: Nov. 5, 2009

Related U.S. Application Data

(60) Provisional application No. 61/122,576, filed on Dec. 15, 2008.

(51) Int. Cl.
 *G06F 3/00* (2006.01)
(52) U.S. Cl.
 USPC .................................................. 710/5; 710/4
(58) Field of Classification Search
 USPC .............. 710/5, 8, 20, 21, 4; 714/11, 53, 743; 711/168; 709/209
 See application file for complete search history.

(56) References Cited

U.S. PATENT DOCUMENTS

| 4,942,579 | A | 7/1990 | Goodlander et al. |
| 5,257,367 | A | 10/1993 | Goodlander et al. |
| 5,720,027 | A | 2/1998 | Sarkozy et al. |
| 5,732,238 | A | 3/1998 | Sarkozy |
| 5,790,774 | A | 8/1998 | Sarkozy |
| 5,893,919 | A | 4/1999 | Sarkozy et al. |
| 6,098,128 | A | 8/2000 | Velez-McCaskey et al. |
| 6,675,258 | B1 * | 1/2004 | Bramhall et al. ............. 711/114 |
| 7,047,450 | B2 * | 5/2006 | Iwamitsu et al. ................ 714/43 |
| 7,596,637 | B2 * | 9/2009 | Nonaka et al. .................. 710/15 |
| 8,219,714 | B2 * | 7/2012 | Forte et al. ........................ 710/2 |
| 8,285,923 | B2 * | 10/2012 | Stevens ......................... 711/112 |
| 2003/0110330 | A1 * | 6/2003 | Fujie et al. ...................... 710/36 |
| 2005/0108476 | A1 * | 5/2005 | Tanaka et al. ................. 711/114 |
| 2005/0154937 | A1 * | 7/2005 | Achiwa ............................ 714/6 |
| 2006/0036777 | A1 * | 2/2006 | Innan et al. ...................... 710/5 |
| 2006/0155883 | A1 * | 7/2006 | Chou et al. ....................... 710/3 |
| 2006/0168362 | A1 * | 7/2006 | Kaneko ............................ 710/8 |

(Continued)

OTHER PUBLICATIONS

Redundancy in enterprise storage networks using dual-domain SAS Configuration, hp, Technology brief, pp. 1-15.*

(Continued)

*Primary Examiner* — Ernest Unelus
(74) *Attorney, Agent, or Firm* — Meunier Carlin & Curfman, LLC

(57) ABSTRACT

Technologies are described herein for providing bi-directional communication between redundant storage controllers in a storage system. One of the storage controllers operates in the initiator role over a point-to-point communication channel connecting the controllers, while the other operates in the target role. To transmit a function call from a storage module executing on the initiator storage controller to a corresponding module executing on the target storage controller, the initiator storage controller issues a write command to the second storage controller over the point-to-point communication channel. In order to transmit a function call from a storage module executing on the target storage controller to a corresponding module executing on the initiator storage controller, the target storage controller responds to a pending anticipatory read command sent from the initiator storage controller over the point-to-point communication channel.

16 Claims, 3 Drawing Sheets

(56) References Cited

U.S. PATENT DOCUMENTS

| | | | |
|---|---|---|---|
| 2006/0224826 A1* | 10/2006 | Arai et al. | 711/114 |
| 2006/0259650 A1* | 11/2006 | Chou et al. | 710/8 |
| 2007/0022264 A1* | 1/2007 | Bromling et al. | 711/162 |
| 2007/0143554 A1* | 6/2007 | Uchida et al. | 711/162 |
| 2007/0168630 A1* | 7/2007 | Hirakawa et al. | 711/162 |
| 2007/0266204 A1* | 11/2007 | Mizuno | 711/111 |
| 2008/0005470 A1* | 1/2008 | Davies | 711/114 |
| 2008/0126663 A1* | 5/2008 | Murakami et al. | 710/311 |
| 2008/0209101 A1* | 8/2008 | Kanai | 711/100 |
| 2010/0115162 A1* | 5/2010 | Chou et al. | 710/74 |
| 2011/0283064 A1* | 11/2011 | Muto et al. | 711/114 |
| 2013/0145064 A1* | 6/2013 | Radovanovic | 710/113 |

OTHER PUBLICATIONS

"Storage Bridge Bay Specification, Version 1.0" by Storage Bridge Bay Working Group, Inc. dated Sep. 21, 2006, 87 pages.

* cited by examiner

BI-DIRECTIONAL COMMUNICATION BETWEEN REDUNDANT STORAGE CONTROLLERS

CROSS-REFERENCE TO RELATED APPLICATION

This application claims the benefit of U.S. provisional patent application No. 61/122,576 filed on Dec. 15, 2008, entitled "Maintaining Data and Metadata Cache Coherency in Active/Active Dual Redundant Storage Servers," which is expressly incorporated herein by reference in its entirety.

BACKGROUND

Clustered storage systems allow multiple storage computers and other storage devices to work together in a coherent storage system. Clustered storage systems utilize various configurations of multiple storage controllers, physical storage devices, processors, memory, and other resources to increase the performance of the storage system as well as provide redundancy and high availability.

One such configuration is a high availability cluster with two redundant storage controllers: a primary controller and a secondary controller, which share a set of physical storage devices, such as a disk array. In this configuration, the primary controller may field input/output ("I/O") operations against the array while the secondary controller operates as a "hot-spare" to the primary controller. Components or modules of the storage stack on the primary controller may share data and metadata regarding active transactions, logical volumes, etc., with their counterparts on the secondary controller in order to keep the secondary controller in the hot-spare state. In the event of a failure of the primary controller, the secondary controller has all the information required to take over servicing I/Os against the array. Technologies such multipath I/O ("MPIO") may make such node-failovers transparent to the initiators. However, in such a configuration, the additional processing power of the secondary controller generally goes unutilized while the controller is in the hot-spare state.

Another configuration may involve the two storage controllers each fielding I/O operations for a portion of the disk array. The disks of the array may be logically grouped into two storage groups, with each storage controller acting as a primary controller for one of the storage groups, while also acting as a hot-spare to the other storage controller for the other storage group. In this configuration, because each controller acts as both a primary controller and a secondary controller or hot-spare, the components of the storage stack on the storage controllers may be required to both send and receive data and metadata with their counterparts on the other controller.

It is with respect to these considerations and others that the disclosure made herein is presented.

SUMMARY

Technologies are described herein for providing bi-directional communication between redundant storage controllers in a storage device. Through the utilization of the technologies and concepts presented herein, storage modules executing on the storage controllers may communicate with their counterparts on the other controller over a point-to-point communication channel. One of the storage controllers operates in the initiator role over the point-to-point communication channel, and the other operates in the target role.

According to one embodiment, the initiator storage controller sends an anticipatory read command to the target storage controller. In order to transmit a function call from a storage module executing on the initiator storage controller to a corresponding module executing on the target storage controller, the initiator storage controller issues a write command to the second storage controller over the point-to-point communication channel. In order to transmit a function call from a storage module executing on the target storage controller to a corresponding module executing on the initiator storage controller, the target storage controller responds to the anticipatory read command sent from the initiator storage controller over the point-to-point communication channel.

It should be appreciated that the above-described subject matter may also be implemented as a computer-controlled apparatus, a computer process, a computing system, or an article of manufacture, such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing bi-directional communication between redundant storage controllers in a storage system. While the subject matter described herein is presented in the general context of program modules that execute on one or more storage controllers in a storage system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, microprocessor-based or programmable consumer electronics, minicomputers, mainframe computers, special-purpose hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Figure 1:
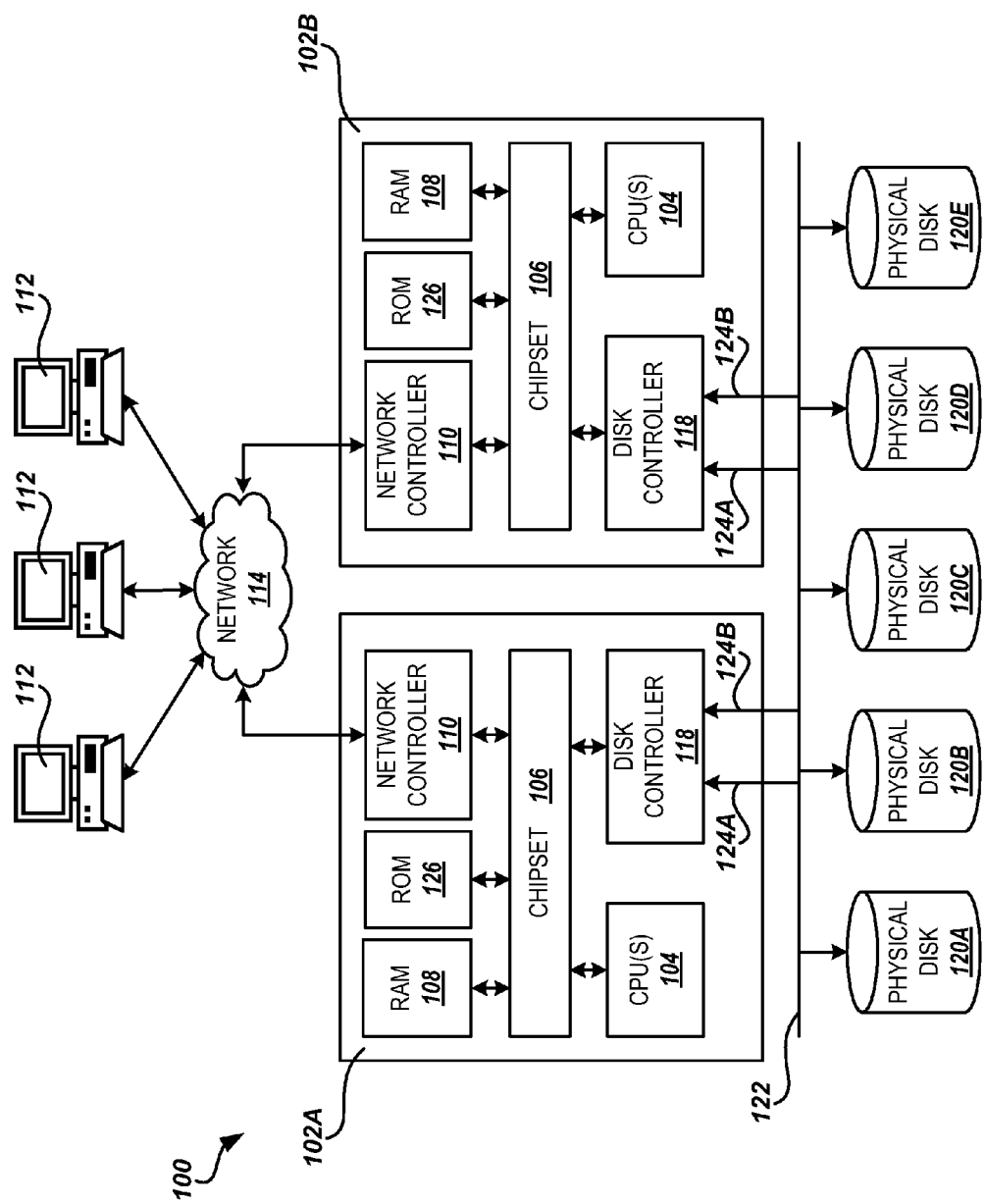
FIG. 1 is a computer architecture diagram illustrating a computer hardware architecture for a storage system including redundant storage controllers, according to embodiments presented herein.

FIG. 1 and the following discussion are intended to provide a brief, general description of a suitable computing environment in which the embodiments described herein may be implemented. In particular, FIG. 1 shows an exemplary storage system 100 including two storage computers, or storage controllers 102A, 102B (also referred to herein as storage controller 102). Each storage controller 102 includes a baseboard, or "motherboard," which is a printed circuit board to which a multitude of components or devices may be connected by way of a system bus or other electrical communication paths. In one illustrative embodiment, one or more central processing units ("CPUs") 104 operate in conjunction with a chipset 106. The CPUs 104 are standard programmable processors that perform arithmetic and logical operations necessary for the operation of the storage controller 102.

The CPUs 104 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 106 provides an interface between the CPUs 104 and the remainder of the storage controller 102. The chipset 106 also provides an interface to a random access memory ("RAM") 108 used as the main memory in the storage controller 102. The chipset 106 also includes functionality for providing network connectivity through a network controller 110, such as a gigabit Ethernet adapter. The network controller 110 is capable of connecting the storage controllers 102A, 102B to each other as well as to other client computers 112 acting as initiators of I/O operations over a network 114. The network 114 may be an Ethernet or Gigabyte Ethernet LAN, a fiber ring, a fiber star, wireless, optical, satellite, a WAN, a MAN, or any other network technology, topology, protocol, or combination thereof.

According to embodiments, each storage controller 102A, 102B is connected to a number of physical storage devices, such as physical disks 120A-120E (also referred to herein as physical disks 120) shown in FIG. 1. The physical disks 120 provide the data storage capacity required for the storage controller 102 to store data and service I/O operations initiated by the client computers 112 over the network 114. A disk controller 118 allows the storage controller 102 to communicate with the physical disks 120 connected to the storage controller. According to one embodiment, the disk controller 118 may interface with the physical disks 120 through a serial attached SCSI ("SAS") interface. In other embodiments, the disk controller 118 may interface with the physical disks 120 utilizing a serial advanced technology attachment ("SATA") interface, a fiber channel ("FC") interface, or other standard interface for physically connecting and transferring data between computers and physical storage devices.

According to embodiments, the physical disks 120 may be connected to the storage controller 102 through a bus 122 that allows the disk controller 118 to communicate with the disks. In one embodiment, the physical and electrical structure of the bus 122 may be based upon the storage bridge bay ("SBB") specification. The SBB specification defines mechanical, electrical, and low-level enclosure management requirements for a single enclosure that supports the connection of multiple storage controllers 102 as well as multiple physical disks 120 from a variety of hardware and system vendors. The SBB mid-plane provides the bus 122 that allows multiple storage controllers 102A, 102B to be connected to and communicate with the physical disks 120 concurrently.

In addition, the SBB mid-plane bus 122 provides facilitates for the storage controllers 102A, 102B to communicate with each other via the SAS, SATA, or FC interface implemented on the bus. According to embodiments, the disk controller 118 is capable of utilizing multiple point-to-point communication channels, or ports 124A, 124B, to communicate with other devices over the SBB bus 122. For example, the disk controller 118 may utilize one or more ports 124A to communicate with each physical disk 120 across the bus 122, while utilizing a separate port 124B to communicate across the bus with the other storage controller 102. As will be described in more detail below, the disk controller 118 may only be capable as operating as either an "initiator" or a "target" in regard to each port 124A, 124B, but may be capable of operating as an initiator on one port 124A while simultaneously operating as a target on another port 124B.

The storage controller 102 may store data on the physical disks 120 by transforming the physical state of the disks to reflect the information being stored. The specific transformation of physical state may depend on various factors, in different implementations of this description. Examples of such factors may include, but are not limited to, the technology used to implement the physical disks 120, whether the physical disks are characterized as primary or secondary storage, and the like. For example, the storage controller 102 may store data to the physical disks 120 by issuing instructions to the disk controller 118 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The storage controller 102 may further read information from the physical disks 120 by detecting the physical states or characteristics of one or more particular locations within the devices.

In addition to the physical disks 120 described above, the storage controller 102 may have access to other computer-readable storage medium to store and retrieve information, such as program modules, data structures, or other data. It should be appreciated by those skilled in the art that computer-readable storage media can be any available media that can be accessed by the storage controller 102. By way of example, and not limitation, computer-readable storage media may include volatile and non-volatile, removable and non-removable media implemented in any method or technology. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the storage controller 102.

The computer-readable storage media may store an operating system (not shown) utilized to control the operation of the storage controller 102. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The computer-readable storage media may store other system or application programs and data utilized by the storage controller 102. In one embodiment, the computer-readable storage medium may be encoded with computer-executable instructions that, when loaded into the storage controller 102, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the storage controller 102 by specifying how the CPUs 104 transitions between states, as described above. According to one embodiment, the storage controller 102 may have access to computer-readable storage media storing computer-executable instructions that, when executed by the computer system, perform the routines for providing bi-directional communication between redundant storage controllers in a storage system, described below in regard to FIGS. 3 and 4.

The chipset 106 may also provide an interface to a computer-readable storage medium such as a ROM 126 or NVRAM for storing a firmware that includes program code containing the basic routines that help to startup the storage controller 102 and to transfer information between elements within the storage controller. The ROM 124 or NVRAM may also store other software components necessary for the operation of the storage controller 102 in accordance with the embodiments described herein. It will be appreciated that the storage controller 102 may not include all of the components shown in FIG. 1, may include other components that are not explicitly shown in FIG. 1, or may utilize an architecture completely different than that shown in FIG. 1.

Figure 2:
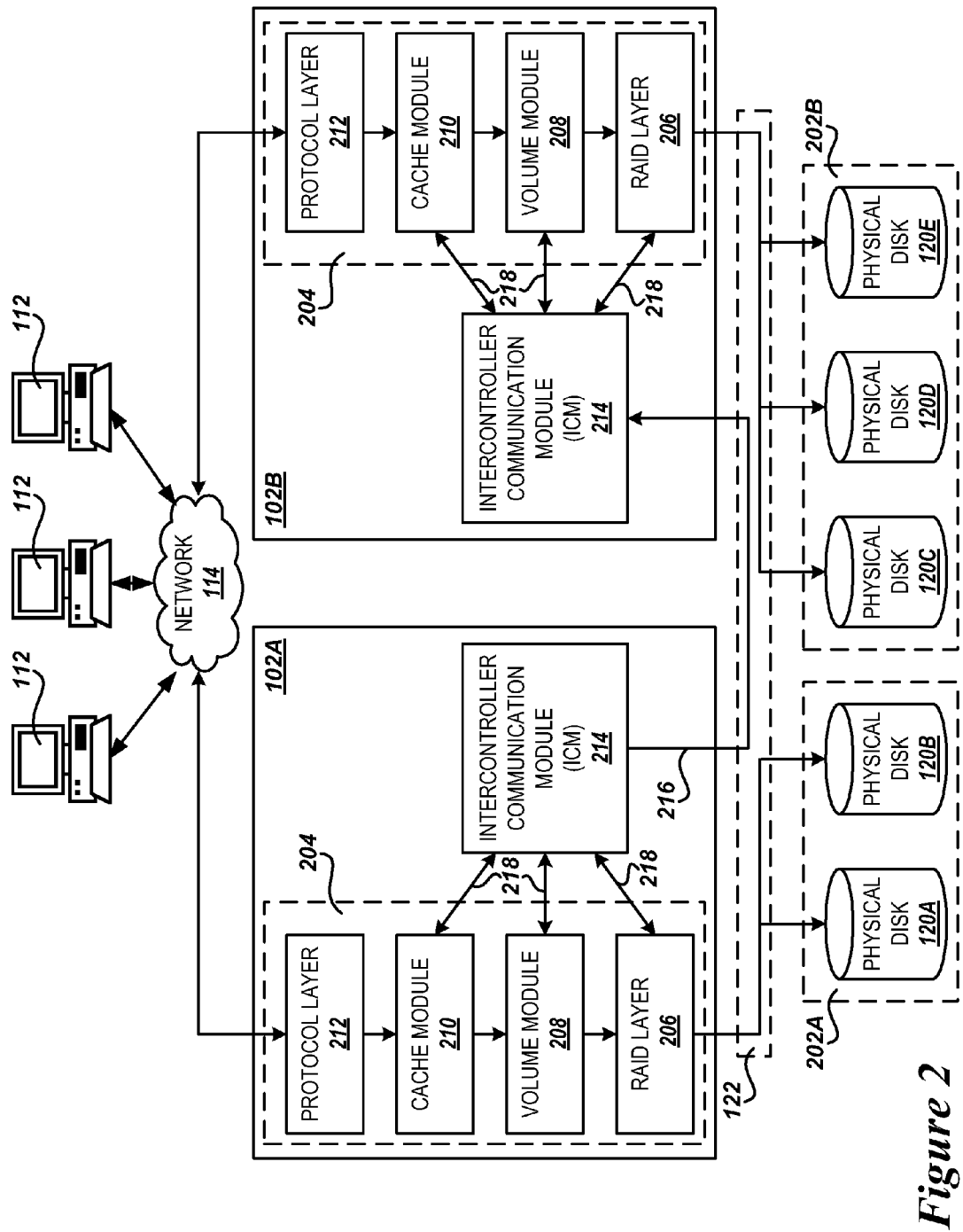
FIG. 2 is a block diagram showing aspects of the redundant storage controllers and the associated logical storage groups, including several software components provided by the embodiments presented herein.

FIG. 2 shows further aspects of the storage controllers 102, including software components and interfaces utilized by the embodiments described herein. According to embodiments, the storage controllers 102A and 102B may be configured in an active-active configuration, such that each storage controller actively processes read and write I/O operations initiated by the client computers 112. In this configuration, the physical disks 120A-120E connected to the bus 122 may be logically divided into storage groups 202A, 202B (also referred to herein generally as storage group 202). Each storage controller 102A, 102B may process I/O operations targeted to one of the logical storage groups 202A, 202B. For example, storage controller 102A may process I/O operations against physical disks 120A and 120B belonging to storage group 202A, while storage controller 102B processes I/O operations against physical disks 120C-120E belonging to storage group 202B.

The physical disks 120 in each of the logical storage groups 202A, 202B may be organized into a redundant array of inexpensive disks ("RAID"), such as a RAID 5 array. It will be appreciated, however, that the embodiments described herein may be utilized with storage controllers 102 connected to storage groups 202A, 202B organized at other standard RAID levels, and that the RAID level in each of the storage groups need not be the same. It will be further appreciated that the physical disks 120 within each of the logical storage groups 202A, 202B may be configured in other configurations beyond the RAID configurations described herein.

The storage controller 102 implements a storage stack 204 which contains storage modules and interfaces allowing the storage controller to process I/O operations initiated from the client computers 112 against the physical disks 120 in the associated logical storage group 202. The storage controller 102 accesses the physical disks 120 through a RAID layer 206. The RAID layer 206 abstracts the organization of the physical disks 120 in the storage group 202 and presents a logical block-level interface to higher layers in the storage stack 204. The RAID layer 206 may be implemented on the storage controller 102 in software, hardware, or a combination thereof. In one embodiment, the RAID layer is provided by the MD kernel extension provided by the LINUX operating system. In another embodiment, the RAID layer 206 may be provided by a MEGARAID® storage adapter from LSI Corporation of Milpitas, Calif., installed in the storage controller 102. It will be appreciated that the RAID layer may be implemented by software and/or hardware components from a variety of vendors beyond those described herein.

A volume module 208 utilizes the block-level interface provided by the RAID layer 206 to manage the storage provided by the storage group 202 and service I/O operations initiated by the client computers 112 across the network 114. The volume module 208 may be implemented on the storage controller 102 in software, hardware, or a combination thereof. The volume module 208 may implement a variety of storage management functions, such as volume virtualization, thin provisioning, snapshots, locking, data replication, etc.

Volume virtualization provides the facility to create and manage multiple, logical volumes in the storage group 202, as well as expand a logical volume across multiple storage devices within a storage cluster. Thin provisioning provides for the allocation of physical capacity of the storage group 202 to logical volumes on an as-needed basis. Snapshots provide functionality for creating and utilizing point-in-time snapshots of the contents of logical storage volumes. The locking functionality allows for synchronizing I/O operations within the storage controller 102 or across devices within the storage cluster. Data replication provides functionality for replicating data within the storage controller 102 or across storage devices within a storage cluster.

A cache module 210 may be implemented above the volume module 208 in the storage stack 204. The cache module 210 caches data and metadata regarding active read and write I/O operations initiated against the storage group 202. The cache module 210 may be implemented on the storage controller 102 in software, hardware, or a combination thereof. In one embodiment, the cache module 210 may be the LINUX cache provided by the LINUX operating system.

A protocol layer 212 may also be provided by the storage stack 204 that allows the client computers 112 to access the data stored in the storage group 202 across the network 114. For example, the storage stack 204 may implement a storage area network ("SAN") path that utilizes an internet small computer systems interface ("iSCSI") driver at the protocol layer 212. A network attached storage ("NAS") path may also be provided that utilizes the XFS high-performance journaling file system at the protocol layer. The storage controller 102 may expose logical storage volumes through a block-level interface via the SAN path, while exposing fileshares through a file-level interface via the NAS path. The protocol layer 212 may be implemented on the storage controller 102 in software, hardware, or a combination thereof.

According to embodiments, redundancy is provided in the active-active configuration of the storage system by having each of the storage controllers 102A, 102B operate as both the primary controller for its associated storage group 202A, 202B and a secondary controller or "hot spare" for the other storage controller. For example, as seen in FIG. 2, storage controller 102A may act as the primary controller for storage group 202A while also acting as a hot spare for storage controller 102B and storage group 202B. Similarly, storage controller 102B may act as the primary controller for storage group 202B while also acting as a hot spare for storage controller 102A and storage group 202A. If a primary storage controller 102 fails, the hot spare controller can take over servicing I/O operations for the associated storage group 202. Technologies such multipath I/O ("MPIO") may be implemented by the storage stack 204 to make such controller-failovers transparent to the client computers 112 initiating I/O operations.

In order for each storage controller 102 to function as a secondary controller or hot spare for the other, the various storage modules in the storage stack 204 of the primary controller may be required to communicate data and metadata regarding active I/O operations to their counterparts in the secondary controller. For example, the cache module 210 on the primary controller 102A for the storage group 202A may periodically synchronize active cached items with the cache module 210 on the secondary controller 102B. The volume module 208 on the primary controller 102A may keep allocation tables and other metadata regarding logical volumes residing on the storage group 202A current on the secondary controller 102B. Or, the RAID layer 206 on the primary controller 102A may maintain a table of outstanding writes on the secondary controller 102B in order for the controller to be able to perform a consistency check if the case of a failure of the primary controller and recovery by the secondary controller.

It will be appreciated that, because each storage controller 102 is acting as both the primary controller for the associated storage group 202 as well as the secondary controller for the opposite storage group, the communication between storage modules and the storage controllers must be bi-directional. In other words, the modules on the primary controller 102A for storage group 202A must be able to write data and metadata to the modules of its secondary controller 102B, and the modules on the primary controller 102B for storage group 202B must be able to write data and metadata to the modules of its secondary controller 102A.

The communication of data and metadata between the storage modules of the separate storage controllers 102 may be facilitated by an inter-controller communication module ("ICM") 214 executing on each storage controller 102. The ICM 214 may be implemented on the storage controller 102 in software, hardware, or a combination thereof. In one embodiment, the ICM 214 on each storage controller 102 communicates with the corresponding controller through the disk controller 118 via a port 124B provided by the bus 122 connecting the storage controllers. As described above regarding FIG. 1, the bus port 124B may provide a point-to-point communication channel 216 between the storage controllers 102 utilizing the SAS, SATA, or FC interface implemented on the bus 122.

Utilizing the bus port 124B for inter-controller communications may provide benefits over other connections that may exist between the storage controllers 102, such as the network 114. For example the bus port 124B may provide greater bandwidth (12 GB for a SAS port) compared to typical network connection (1 GB for an Ethernet connection). In addition, the software stack for communicating over the bus port 124B is already implemented via the disk controller 118 and may be smaller and more efficient than a typical TCP/IP stack utilized to communicate across the network 114.

However, the SAS, SATA, or FC interface implemented on the bus 122 may not provide for bi-directional communication through the bus port 124B, and may require that a storage controller 102 operate in either an "initiator" role or a "target" role while communicating over the bus 122. For example, in the SAS protocol, a SAS initiator may execute SCSI commands against a SAS target, but the target is not able to initiate commands against the initiator. While some implementations of the bus 122 may allow the storage controller 102 to operate in both roles simultaneously, the hardware used in these "dual role" implementations may be more complex and may not provide as stable an environment as the traditional and more widely used single-mode hardware.

The embodiments described below provide a method for implementing bi-directional communication between the two storage controllers 102 in the simpler and more stable single-mode bus implementations. In these embodiments, the ICM 214 on one of the storage controllers 102A may operate in the initiator role, while the ICM on the other storage controller 102B may operate in the target role while performing inter-controller communication over the point-to-point communication channel 216 through the bus port 124B.

According to embodiments, in order to provide bi-directional communication between the storage modules of the two storage controllers 102, the ICM 214 implements one routine for communicating from initiator to target and another routine for communicating from target to initiator, as will be described in detail below in regard to FIGS. 3 and 4. In one embodiment, the two routines, as well as the operating role of the ICM 214, are abstracted from the communicating storage modules, which utilize an application programming interface ("API") 218 provided by the ICM to communicate with the counterpart module. The storage modules utilize the same function call in the API 218 to communicate with a remote module regardless of whether the ICM 214 on the storage controller 102 is operating in the initiator role or the target role.

Figure 3:
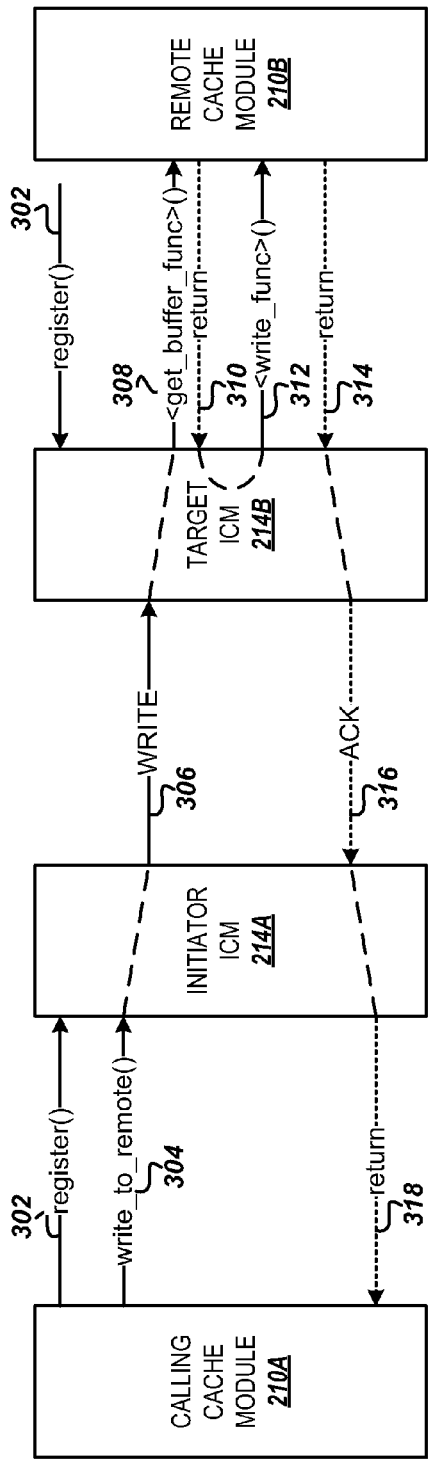
FIG. 3 is a block diagram illustrating one method for communicating between redundant storage controllers, from initiator to target, according to the embodiments presented herein.
Figure 4:
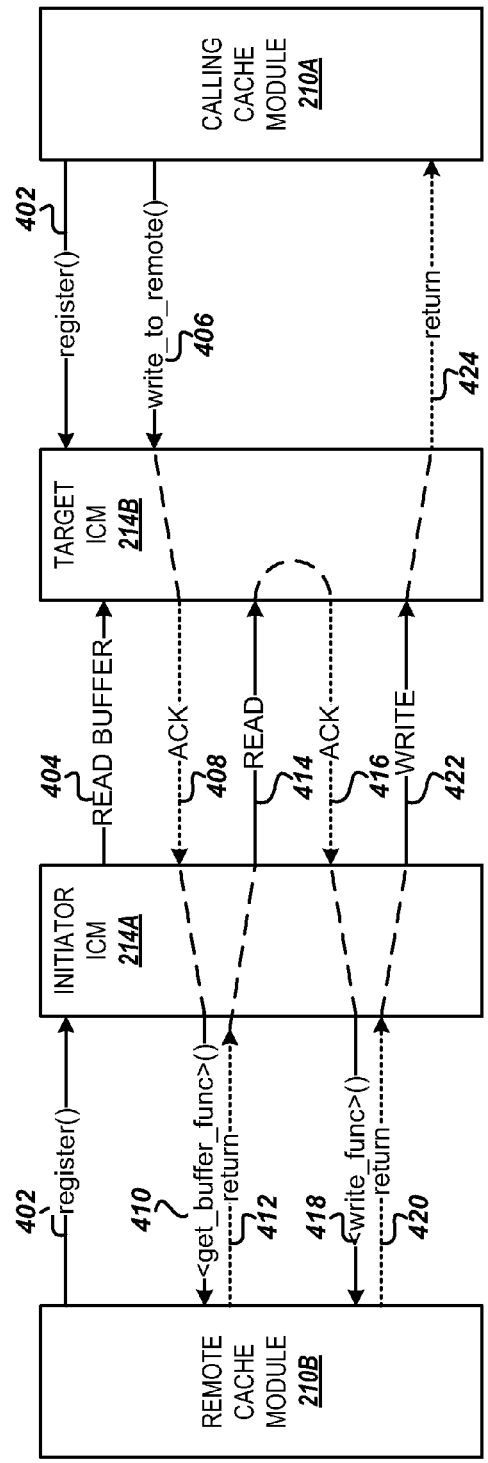
FIG. 4 is a block diagram illustrating another method for communicating between redundant storage controllers, from target to initiator, according to the embodiments presented herein.

Turning now to FIGS. 3 and 4, additional details will be provided regarding the embodiments presented herein for providing bi-directional communication between redundant storage controllers in a storage system. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 illustrates a routine for communicating between two corresponding storage modules of the storage controller 102, for example the cache modules 210, when the communication is initiated by the cache module executing on the storage controller where the ICM 214 is operating in the initiator role. This may be the case when the cache module 210 executing on the primary controller 102A for the storage group 202A (the calling cache module 210A) wishes to synchronize active cache items with the cache module executing on the corresponding secondary controller 102B (the remote cache module 210B). In this example, the ICM 214 executing on the primary controller 102A is operating in the initiator role (the initiator ICM 214A), while the ICM executing on the secondary controller 102B is operating the in target role (the target ICM 214B).

The routine begins with operation 302, where each of the cache modules 210A, 210B executing on the respective storage controllers 102A, 102B calls a registration function of the API 218 provided by the corresponding ICM 214A, 214B. The registration function provides a means by which the ICM 214 may provide to each module incoming data and metadata sent to that module. Each module requiring the inter-controller communications may register with the ICM 214 when the storage controller 102 is initialized. In one embodiment, the registration function takes the form:

register(start_lba, end_lba, get_buffer_func, write_func)

where the "start_lba" and "end_lba" parameters specify an address range for which incoming communications are targeted to the module, the "get_buffer_func" parameter specifies a reference to a get buffer callback function that the ICM 214 may call to allocate a buffer for storing incoming data and metadata, and the "write_func" parameter specifies a reference to a write callback function that the ICM may call to write incoming data and metadata to the module.

Because the ICM 214 utilizes the communication channel 216 provided by the disk controller 118 over the bus port 124B for inter-controller communication, the communication may take the form of SCSI commands or other storage oriented commands which generally specify a target logical unit, a logical block address ("LBA"), a length of data to read or write, and the corresponding data to be written. The communicating storage modules on the storage controllers 102 may leverage this communication architecture by mapping specific addresses to specific functions.

For example, the cache module 210 may map a specific LBA or range of LBAs to the cache synchronization function. Further, the storage modules may encode additional information or parameters into the LBA used to call a specific function. For example, the cache module 210 may use separate LBAs to synchronize individual cache lines. The data for the cache line is synchronized with the remote cache module 210B by writing the cache line data to the LBA corresponding to that cache line within the range of addresses mapped for the cache synchronization function. The "start_lba" and "end_lba" parameters of the registration function provided by the ICM 214 specify the range of addresses for which each calling module is interested, i.e. those LBAs for which incoming data corresponds to functions provided by that module.

Once each of the respective cache modules 210A, 210B are registered with the corresponding ICM 214A, 214B, the routine proceeds to operation 304, where the calling cache module 210A calls a write function of the API 218 provided by the initiator ICM 214A to write data to the remote cache module 210B executing on the storage controller 102B with the target ICM 214B. This may be the case where the calling cache module 210A executing on the primary controller 102A wishes to synchronize active cache items with the remote cache module 210B executing on the storage controller 102B acting as the hot spare, as described above. According to one embodiment, the write function takes the form:

write_to_remote(lba, len, buffers, ack_reqd)

where the "lba" parameter specifies the address corresponding to the function of the remote module to call, the "len" parameter specifies the length of the data to be written, the "buffers" parameter points to the data and/or metadata to be written to remote cache module, and the "ack_reqd" parameter is an acknowledgment flag indicating whether a response from the remote cache module is required.

From operation 304, the routine proceeds to operation 306, where the initiator ICM 214A issues a write command to the target ICM 214B via the communication channel 216. For example, the initiator ICM 214A may issue a SCSI WRITE command specifying the storage controller 102B with the target ICM 214B as the target device, and the LBA, length, data, and acknowledgment flag specified by the calling cache module 210A in the write function call at operation 304. Upon receiving the write command, the target ICM 214B checks the LBA against the address ranges previously registered to determine the target module of the storage controller 102B for the write. In the example illustrated in FIG. 3, the target ICM 214B determines that the LBA specified in the write command corresponds to the remote cache module 210B on the storage controller 102B.

The routine then proceeds to operation 308, where the target ICM 214B calls the get buffer callback function previously registered by the remote cache module 210B to allocate a buffer for the data and/or metadata received from the initiator ICM 214A. According to one embodiment, the get buffer callback function takes the form:

<get_buffer_func>(lba, len, buffers)

where "get_buffer_func" is the reference to the get buffer callback function registered by the remote cache module 210B and the "lba" and "len" parameters correspond to the values specified by the calling cache module 210A in the write function call at operation 304. The remote cache module 210B may allocate the buffers for the data and/or metadata received from the initiator ICM 214A and return the buffers to the target ICM 214B at operation 310. This allows the storage modules to manage their own memory for incoming data and/or metadata, thus avoiding memory management or memory copy operations in the communication layer The target ICM 214B may then copy the data received from the initiator ICM 214A in the write command to the allocated buffers.

From operation 310, the routine proceeds to operation 312, where the target ICM 214B calls the write callback function previously registered by the remote cache module 210B to perform the function with specified data and/or metadata. According to one embodiment, the write callback function takes the form:

<write_func>(lba, len, buffers)

where "write_func" is the write callback reference registered by the remote cache module 210B, the "lba" and "len" parameters correspond to the values specified by the calling cache module 210A in the write function call at operation 304, and the "buffers" parameters contain the data and/or metadata received from the initiator ICM 214A. The remote cache module 210B may then perform the specified function.

The routine proceeds from operation 312 to operation 314 where the remote cache module 210B returns a result code to the target ICM 214B indicating the success or failure of the function. The target ICM 214B then checks the acknowledgment flag received from the write command to determine whether the result should be returned to the calling module. Depending on the function, the calling module may expect a reply from the call to the remote module. For example, if caching a write I/O operation with a write-back cache, the calling cache module 210A on the primary controller 102A may wait for a successful response from the synchronize cache function call to the remote cache module 210B on the secondary controller before completing the I/O operation to the initiating client computer 112.

If the acknowledgment flag received from the write command indicates that the result should be returned to the calling cache module 210A, then the routine proceeds to operation 316, where the target ICM 214B returns an acknowledgement to the SCSI WRITE command issued by the initiator ICM 214A at operation 306. The acknowledgement may contain the result code from the remote cache module 210B. The routine then proceeds to operation 318, where, upon receiving the acknowledgment containing the result code from the target ICM 214B, the initiator ICM 214A returns the result code to the calling cache module 210A in response to the write function call at operation 304.

It will be appreciated that the API 218 provided by the ICM 214 abstracts the complexities of communicating with the remote cache module 210B via he point-to-point communication channel 216 from the calling cache module 210A. The calling cache module 210A must merely call the write function provided by the API 218, such as the "write_to_remote( )" function described above in regard to operation 304, and the result of the corresponding function executed by the remote cache module 210B is returned to the calling cache module 210A as a return code from the write function. As will become apparent below in the discussion regarding FIG. 4, the API 218 also abstracts the operating role of the ICM 214 executing on the respective storage controllers 102.

FIG. 4 illustrates a routine for communicating between two corresponding storage modules, for example the cache modules 210, when the communication is initiated by the cache module executing on the storage controller 102 where the ICM 214 is operating in the target role. This may be the case when the cache module 210 executing on the primary controller 102B for the storage group 202B (the calling cache module 210A) wishes to synchronize active cache items with the cache module executing on the corresponding secondary controller 102A (the remote cache module 210B). However, in this case the ICM 214 executing on the primary controller 102B is operating in the target role (the target ICM 214B), while the ICM executing on the secondary controller 102A is operating in the initiator role (the initiator ICM 214A).

The routine begins with operation 402, where each of the cache modules 210A, 210B executing on the respective storage controllers 102B, 102A calls the registration function of the API 218 provided by the corresponding ICM 214B, 214A, as described above in regard to operation 302. From operation 402, the routine proceeds to operation 404, where the initiator ICM 214A issues an anticipatory read command to the target ICM 214B via the communication channel 216 provided by the disk controller 118 over the bus port 124B. For example, the initiator ICM 214A may issue a SCSI READ BUFFER command specifying the storage controller 102B with the target ICM 214B as the target device. The anticipatory read command will remain pending until acknowledged by the target ICM 214B, and the initiator ICM 214A is free to send other commands to the target ICM 214B while the anticipatory read command is pending.

The routine then proceeds to operation 406, where the calling cache module 210A calls the write function of the API 218 provided by the target ICM 214B to write data to the remote cache module 210B executing on the other storage controller 102A. This write function may take the same form of the "write_to_remote( )" function described above in regard to operation 304. Upon receiving the write function call, the target ICM 214B stores the data and/or metadata specified in the call in a temporary location and then, at operation 408, returns an acknowledgement to the anticipatory read command issued by the initiator ICM 214A at operation 404. According to embodiments, the acknowledgement returned to the initiator ICM 214A indicates that a remote call is pending and contains the LBA, length, and acknowledgment flag values specified by the calling cache module 210A in the write function call at operation 406.

Upon receiving the acknowledgment to the anticipatory read command, the initiator ICM 214A checks the LBA against the address ranges previously registered to determine the target module of the storage controller 102A for the pending remote call. In the example illustrated in FIG. 4, the initiator ICM 214A determines that the LBA specified in the acknowledgment corresponds to the remote cache module 210B on the storage controller 102A. The routine then proceeds to operation 410, where the initiator ICM 214A calls the get buffer callback function previously registered by the remote cache module 210B to allocate a buffer for the data and/or metadata for the pending remote call, specifying the LBA and length received in the acknowledgement. The remote cache module 210B then allocates the buffers for the data and returns the buffers to the initiator ICM 214A at operation 412.

From operation 412, the routine proceeds to operation 414, where the initiator ICM 214A issues a read command to the target ICM 214B via the communication channel 216 to read the data and/or metadata for the pending remote call. For example, the initiator ICM 214A may issue a SCSI READ command specifying the storage controller 102B with the target ICM 214B as the target device, and the LBA and length received in the acknowledgment of the anticipatory read command. Upon receiving the read command, the target ICM 214B retrieves the data and/or metadata for the pending remote call from the temporary location and returns the data to the initiator ICM 214A in an acknowledgment to the read command at operation 416.

After reading the data and/or metadata for the pending remote call from the target ICM 214B, the initiator ICM 214A copies the data to the buffers allocated by the remote cache module 210B at operation 410. The routine then proceeds to operation 418, where the initiator ICM 214A calls the write callback function previously registered by the remote cache module 210B with the LBA, length, and retrieved data and/or metadata. The remote cache module 210B may then perform the function specified by the LBA and the data and, at operation 420, returns a result code to the initiator ICM 214A indicating the success or failure of the function.

The initiator ICM 214A then checks the acknowledgment flag for the pending remote call received in the acknowledgment of the anticipatory read command to determine whether the result should be returned to the calling module, as described above in regard to operation 314. If the acknowledgment flag for the pending remote call indicates that the result should be returned to the calling cache module 210A, then the routine proceeds to operation 422, where the initiator ICM 214A issues a write command to the target ICM 214B with the result code. For example, the initiator ICM 214A may issue a SCSI WRITE specifying the storage controller 102B with the target ICM 214B as the target device, the LBA and length received in the acknowledgment of the anticipatory read command to identify the pending remote call, and the result code returned by the remote cache module 210B. The routine then proceeds to operation 424, where, upon receiving the result code from the initiator ICM 214A, the target ICM 214B returns the result code to the calling cache module 210A in response to the write function call from operation 406.

It will be appreciated that each I/O operation from a client computer 112 handled by the primary controller may trigger at least one write command from the primary controller to the secondary controller in cases where the ICM 214 on the primary controller is operating in the initiator role, or the I/O operation may trigger at least one acknowledgement to an anticipatory read command, a read command, and a write command in cases where the ICM on the primary controller is operating in the target role. This may result in a significant number of commands being communicated over the communication channel 216 across the bus 122.

In a further embodiment, the target ICM 214B may batch data regarding multiple pending remote calls into a single acknowledgement to the anticipatory read command described above in regard to operation 408. This may reduce bandwidth utilization on the communication channel 216 by allowing multiple remote calls to be sent to the initiator ICM 214A in one transaction. Similarly, the initiator ICM 214A may batch data and other information regarding multiple pending remote calls in the read command at operation 414, the write command at operation 306, or the write result code command at operation 422, further reducing communication traffic on the bus 122.

Based on the foregoing, it should be appreciated that technologies for providing bi-directional communication between redundant storage controllers in a storage system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing bi-directional communication between storage modules executing on a first storage controller and a second storage controller, wherein the first and second storage controllers are connected via a point-to-point communication channel, the point-to-point communication channel being a Serial-Attached Small Computer System Interface (SCSI) channel, the first storage controller is operating in an initiator role with respect to the Serial-Attached SCSI channel, and the second storage controller is operating in a target role with respect to the Serial-Attached SCSI channel, the method comprising:

registering a logical block address range associated with a remote storage module executing on the first storage controller for synchronizing communication between the storage modules executing on the first storage controller and the second storage controller, wherein the logical block address range comprises one or more logical block addresses between a start logical block address and an end logical block address;

sending an anticipatory read command over the Serial-Attached SCSI channel from the first storage controller to the second storage controller, wherein the anticipatory read command comprises a SCSI READ BUFFER command that specifies the second storage controller as a target controller, wherein the first storage controller is configured to send one or more commands over the Serial-Attached SCSI channel to the second storage controller while the SCSI READ BUFFER command is pending;

transmitting a first function call from a calling storage module executing on the first storage controller to a corresponding remote storage module executing on the second storage controller by issuing a write command from the first storage controller to the second storage controller over the Serial-Attached SCSI channel to initiate communication from the first storage controller acting in the initiator role, wherein the write command comprises a SCSI WRITE command, wherein the first storage controller acting in the initiator role initiates a storage module command to the second storage controller acting in the target role by issuing the SCSI WRITE command while the SCSI READ BUFFER command from the first storage controller is pending for the second storage controller;

transmitting a second function call from a calling storage module executing on the second storage controller to a corresponding remote storage module executing on the first storage controller by issuing an acknowledgment to the SCSI READ BUFFER command from the second storage controller to the first storage controller over the Serial-Attached SCSI channel, wherein the acknowledgement to the SCSI READ BUFFER command comprises a logical block address, a length and an acknowledgment flag value specified by the calling storage module executing on the second storage controller, wherein the SCSI READ BUFFER command allows the second storage controller acting in the target role to initiate a storage module command to the first storage controller acting in the initiator role by issuing the acknowledgment to the SCSI READ BUFFER command;

upon receiving the second function call on the first storage controller, determining whether the logical block address included in the acknowledgement to the SCSI READ BUFFER command is between the start logical block address and the end logical block address of the logical block address range associated with the remote storage module executing on the first storage controller for synchronizing communication;

issuing a SCSI READ command, generated by the first storage controller, from the first storage controller to the second storage controller over the Serial-Attached SCSI channel to retrieve one or more of data and metadata associated with the second function call in response to the determination that the logical block address included in the acknowledgment to the SCSI READ BUFFER command is between the start logical block address and the end logical block address of the logical block address range associated with the remote storage module executing on the first storage controller for synchronizing communication, wherein the SCSI READ command specifies the second storage controller as the target controller;

receiving an acknowledgment to the SCSI READ command from the second storage controller, wherein the acknowledgment to the SCSI READ command contains the one or more of data and metadata associated with the second function call; and transmitting a result code to the calling storage module executing on the second storage controller by issuing another SCSI WRITE command from the first storage controller to the second storage controller over the Serial-Attached SCSI channel.

2. The computer-implemented method of claim 1, further comprising:

upon receiving the first function call on the second storage controller, passing the first function call to the remote storage module executing on the second storage controller;

receiving a result code from the remote storage module executing on the second storage controller; and upon receiving the result code from the remote storage module executing on the second storage controller, transmitting the result code to the calling storage module executing on the first storage controller by issuing an acknowledgment to the SCSI WRITE command from the second storage controller to the first storage controller over the Serial-Attached SCSI channel.

3. The computer-implemented method of claim 1, further comprising:

passing the second function call and the one or more of data and metadata associated with the second function call to the remote storage module executing on the first storage controller; and receiving the result code from the remote storage module executing on the first storage controller.

4. The computer-implemented method of claim 1, wherein the first storage controller is a primary controller for a first logical storage group and the second storage controller is acting as a hot spare to the first storage controller in regard to the first logical storage group, and wherein the second storage controller is a primary controller for a second logical storage group and the first storage controller is acting as a hot spare to the second storage controller in regard to the second logical storage group.

5. The computer-implemented method of claim 1, wherein the calling storage module executing on the first storage controller and the calling storage module executing on the second storage controller utilize the same application programming interface to cause the first and second function calls to be transmitted to the corresponding remote storage modules, respectively.

6. The computer-implemented method of claim 1, wherein the SCSI WRITE command issued by the first storage controller to the second storage controller over the Serial-Attached SCSI channel contains one or more of data and metadata associated with a plurality of function calls from calling storage modules executing on the first storage controller to corresponding remote storage modules executing on the second storage controller.

7. The computer-implemented method of claim 3, wherein the acknowledgment to the SCSI READ BUFFER command issued by the second storage controller to the first storage controller over the Serial-Attached SCSI channel contains information regarding a plurality of function calls from calling storage modules executing on the second storage controller to corresponding remote storage modules executing on the first storage controller.

8. A non-transitory computer-readable storage medium having computer-executable instructions stored thereon that, when executed by a first storage controller in a storage system comprising the first storage controller and a second storage controller connected via a point-to-point communication channel, the point-to-point communication channel being a Serial-Attached Small Computer System Interface (SCSI) channel, cause the first storage controller to:

operate in an initiator role with respect to the Serial-Attached SCSI channel;

register a logical block address range associated with a remote storage module executing on the first storage controller for synchronizing communication between storage modules executing on the first storage controller and the second storage controller, wherein the logical block address range comprises one or more logical block addresses between a start logical block address and an end logical block address;

send an anticipatory read command over the Serial-Attached SCSI channel to the second storage controller, wherein the anticipatory read command comprises a SCSI READ BUFFER command that specifies the second storage controller as a target controller, wherein the first storage controller is configured to send one or more commands over the Serial-Attached SCSI channel to the second storage controller while the SCSI READ BUFFER command is pending;

expose an application programming interface to storage modules executing on the first storage controller;

receive a first function call from one of the storage modules executing on the first storage controller over the application programming interface; and transmit the first function call to a corresponding remote storage module executing on the second storage controller by issuing a write command to the second storage controller over the Serial-Attached SCSI channel to initiate communication from the first storage controller acting in the initiator role, wherein the write command comprises a SCSI WRITE command, wherein the first storage controller acting in the initiator role initiates a storage module command to the second storage controller acting in the target role by issuing the SCSI WRITE command while the SCSI READ BUFFER command from the first storage controller is pending for the second storage controller;

the non-transitory computer-readable storage medium having further computer-executable instructions stored thereon that, when executed by the second storage controller in the storage system, cause the second storage controller to:

operate in a target role with respect to the Serial-Attached SCSI channel;

expose an application programming interface to storage modules executing on the second storage controller;

receive a second function call from one of the storage modules executing on the second storage controller over the application programming interface; and transmit the second function call to a corresponding remote storage module executing on the first storage controller by issuing an acknowledgment to the SCSI READ BUFFER command sent by the first storage controller over the Serial-Attached SCSI channel, wherein the acknowledgement to the SCSI READ BUFFER command comprises a logical block address, a length and an acknowledgment flag value specified by the one of the storages module executing on the second storage controller, wherein the SCSI READ BUFFER command allows the second storage controller acting in the target role to initiate a storage module command to the first storage controller acting in the initiator role by issuing the acknowledgment to the SCSI READ BUFFER command; and the non-transitory computer-readable storage medium having further computer-executable instructions stored thereon that, when executed by the first storage controller, cause the first storage controller to:
upon receiving the second function call over the Serial-Attached SCSI channel, determine whether the logical block address included in the acknowledgement to the SCSI READ BUFFER command is between the start logical block address and the end logical block address of the logical block address range associated with the remote storage module executing on the first storage controller for synchronizing communication;
issue a SCSI READ command, generated by the first storage controller, to the second storage controller over the Serial-Attached SCSI channel to retrieve one or more of data and metadata associated with the second function call in response to the determination that the logical block address included in the acknowledgment to the SCSI READ BUFFER command is between the start logical block address and the end logical block address of the logical block address range associated with the remote storage module executing on the first storage controller for synchronizing communication, wherein the SCSI READ command specifies the second storage controller as the target controller;
receive an acknowledgment to the SCSI READ command from the second storage controller, wherein the acknowledgment to the SCSI READ command contains the one or more of data and metadata associated with the second function call; and
transmit a result code to the calling storage module executing on the second storage controller by issuing another SCSI WRITE command from the first storage controller to the second storage controller over the Serial-Attached SCSI channel.

9. The non-transitory computer-readable storage medium of claim 8, having further computer-executable instructions stored thereon that, when executed by the second storage controller in the storage system, cause the second storage controller to:
upon receiving the first function call over the Serial-Attached SCSI channel, pass the first function call to the remote storage module executing on the second storage controller;
receive a result code from the remote storage module executing on the second storage controller; and
upon receiving the result code from the remote storage module executing on the second storage controller, transmit the result code to the calling storage module executing on the first storage controller by issuing an acknowledgment to the SCSI WRITE command from the first storage controller over the Serial-Attached SCSI channel.

10. The non-transitory computer-readable storage medium of claim 8, having further computer-executable instructions stored thereon that, when executed by the first storage controller, cause the first storage controller to:
pass the second function call and the one or more of data and metadata associated with the second function call to the remote storage module executing on the first storage controller; and
receive the result code from the remote storage module executing on the first storage controller.

11. The non-transitory computer-readable storage medium of claim 8, wherein the first storage controller is a primary controller for a first logical storage group and the second storage controller is acting as a hot spare to the first storage controller in regard to the first logical storage group, and wherein the second storage controller is a primary controller for a second logical storage group and the first storage controller is acting as a hot spare to the second storage controller in regard to the second logical storage group.

12. The non-transitory computer-readable storage medium of claim 8, wherein the SCSI WRITE command issued by the first storage controller to the second storage controller over the Serial-Attached SCSI channel contains one or more of data and metadata associated with a plurality of function calls from storage modules executing on the first storage controller to corresponding storage modules executing on the second storage controller, and wherein the acknowledgment to the SCSI READ command issued by the second storage controller over the Serial-Attached SCSI channel contains information regarding a plurality of function calls from storage modules executing on the second storage controller to corresponding storage modules executing on the first storage controller.

13. A system for providing bi-directional communication between storage modules executing on redundant storage controllers, the system comprising:
a first storage controller;
a second storage controller connected to the first storage controller via a point-to-point communication channel, the point-to-point communication channel being a Serial-Attached Small Computer System Interface (SCSI) channel;
a first instance of an inter-controller communication module executing on the first storage controller and operating in an initiator role with respect to the Serial-Attached SCSI channel; and
a second instance of the inter-controller communication module executing on the second storage controller in the inter-controller communication module executing on the second storage controller and operating in a target role with respect to the Serial-Attached SCSI channel, wherein the inter-controller communication module is configured to:
register a logical block address range associated with a remote storage module executing on the first storage controller for synchronizing communication between storage modules executing on the first storage controller and the second storage controller, wherein the logical block address range comprises one or more logical block addresses between a start logical block address and an end logical block address;
send an anticipatory read command over the Serial-Attached SCSI channel from the first storage controller to the second storage controller, wherein the anticipatory read command comprises a SCSI READ BUFFER command that specifies the second storage controller as a target controller, wherein the first storage controller is configured to send one or more commands over the Serial-Attached SCSI channel to the second storage controller while the SCSI READ BUFFER command is pending;
transmit a first function call from a calling storage module executing on the first storage controller to a corresponding remote storage module executing on the second storage controller by issuing a write command from the first storage controller to the second storage controller over the Serial-Attached SCSI channel to initiate communication from the first storage controller acting in the initiator role, wherein the write command comprises a SCSI WRITE command, wherein the first storage controller acting in the initiator role initiates a storage module command to the second storage controller acting in the target role by issuing the SCSI WRITE command while the SCSI READ BUFFER command from the first storage controller is pending for the second storage controller;

transmit a second function call from a calling storage module executing on the second storage controller to a corresponding remote storage module executing on the first storage controller by issuing an acknowledgment to the SCSI READ BUFFER command from the first storage controller over the Serial-Attached SCSI channel, wherein the acknowledgement to the SCSI READ BUFFER command comprises a logical block address, a length and an acknowledgment flag value specified by the calling storage module executing on the second storage controller, wherein the SCSI READ BUFFER command allows the second storage controller acting in the target role to initiate a storage module command to the first storage controller acting in the initiator role by issuing the acknowledgment to the SCSI READ BUFFER command;

upon receiving the second function call on the first storage controller, determine whether the logical block address included in the acknowledgement to the SCSI READ BUFFER command is between the start logical block address and the end logical block address of the logical block address range associated with the remote storage module executing on the first storage controller for synchronizing communication;

issue a SCSI READ command, generated by the first storage controller, from the first storage controller to the second storage controller over the Serial-Attached SCSI channel to retrieve one or more of data and metadata associated with the second function call in response to the determination that the logical block address included in the acknowledgment to the SCSI READ BUFFER command is between the start logical block address and the end logical block address of the logical block address range associated with the remote storage module executing on the first storage controller for synchronizing communication, wherein the SCSI READ command specifies the second storage controller as the target controller;

receive an acknowledgment to the SCSI READ command from the second storage controller, wherein the acknowledgment to the SCSI READ command contains the one or more of data and metadata associated with the second function call; and transmit a result code to the calling storage module executing on the second storage controller by issuing another SCSI WRITE command from the first storage controller to the second storage controller over the Serial-Attached SCSI channel.

14. The system of claim 13, wherein the first storage controller is a primary controller for a first logical storage group and the second storage controller is acting as a hot spare to the first storage controller in regard to the first logical storage group, and wherein the second storage controller is a primary controller for a second logical storage group and the first storage controller is acting as a hot spare to the second storage controller in regard to the second logical storage group.

15. The system of claim 13, wherein the SCSI WRITE command issued by the inter-controller communication module on the first storage controller to the second storage controller over the Serial-Attached SCSI channel contains one or more of data and metadata associated with a plurality of function calls from storage modules executing on the first storage controller to corresponding storage modules executing on the second storage controller, and wherein the acknowledgment to the SCSI READ BUFFER command issued by the inter-controller communication module on the second storage controller over the Serial-Attached SCSI channel contains information regarding a plurality of function calls from storage modules executing on the second storage controller to corresponding storage modules executing on the first storage controller.

16. The computer-implemented method of claim 1, wherein the SCSI READ BUFFER command and the SCSI READ command issued by the first storage controller are separate commands.

* * * * *